United States Patent
Chang et al.

(10) Patent No.: US 7,432,991 B1
(45) Date of Patent: Oct. 7, 2008

(54) RANDOM ACCESS DISPLAY MONITOR

(76) Inventors: Darwin Chang, 10779 Juniper Ct., Cupertino, CA (US) 95014; Hing S. Tong, 19335 DeHavilland Dr., Saratoga, CA (US) 95070

( * ) Notice: Subject to any disclaimer, the term of this patent is extended or adjusted under 35 U.S.C. 154(b) by 1090 days.

(21) Appl. No.: 10/677,393

(22) Filed: Oct. 1, 2003

(51) Int. Cl.
*H04N 5/66* (2006.01)

(52) U.S. Cl. .......................... 348/739; 345/81; 345/98; 345/55

(58) Field of Classification Search ................. 348/554, 348/555, 556, 558, 537, 581, 739; 345/55, 345/81, 87, 98, 99, 100, 175, 165, 166, 173, 345/204, 698; 382/298
See application file for complete search history.

(56) References Cited

U.S. PATENT DOCUMENTS

| | | | |
|---|---|---|---|
| 5,852,429 A * | 12/1998 | Scheffer et al. | 345/100 |
| 6,384,867 B1 * | 5/2002 | Seino et al. | 348/558 |
| 6,459,424 B1 * | 10/2002 | Resman | 345/173 |
| 6,965,365 B2 * | 11/2005 | Nakamura | 345/87 |
| 7,006,080 B2 * | 2/2006 | Gettemy | 345/175 |
| 7,030,852 B2 * | 4/2006 | Ito et al. | 345/103 |
| 7,068,263 B2 * | 6/2006 | Evanicky et al. | 345/207 |
| 7,280,102 B2 * | 10/2007 | Abileah et al. | 345/204 |

* cited by examiner

*Primary Examiner*—David Ometz
*Assistant Examiner*—Jean W Désir
(74) *Attorney, Agent, or Firm*—Thoams E. Schatzel; Law Offices of Thomas E. Schatzel, PC

(57) ABSTRACT

A digital display panel accepts pixel information according to their row-column coordinates. Each pixel can be individually written and read back, much like a random access memory (RAM). A pixel array self-refreshes, and can retain and display each image frame long after the original writing, like a dynamic random access memory (DRAM). Each pixel is instrumented with a transducer to sense pressure, temperature, light, strain, etc., and provide sensor read-out data that is addressable by row-column coordinates. Such is very useful in touchscreen applications. The transducers and their corresponding pixels each have a special relationship, the transducers can directly manipulate a visual quality of the pixel through a direct connection, without intervention or assistance by a host processor.

6 Claims, 1 Drawing Sheet

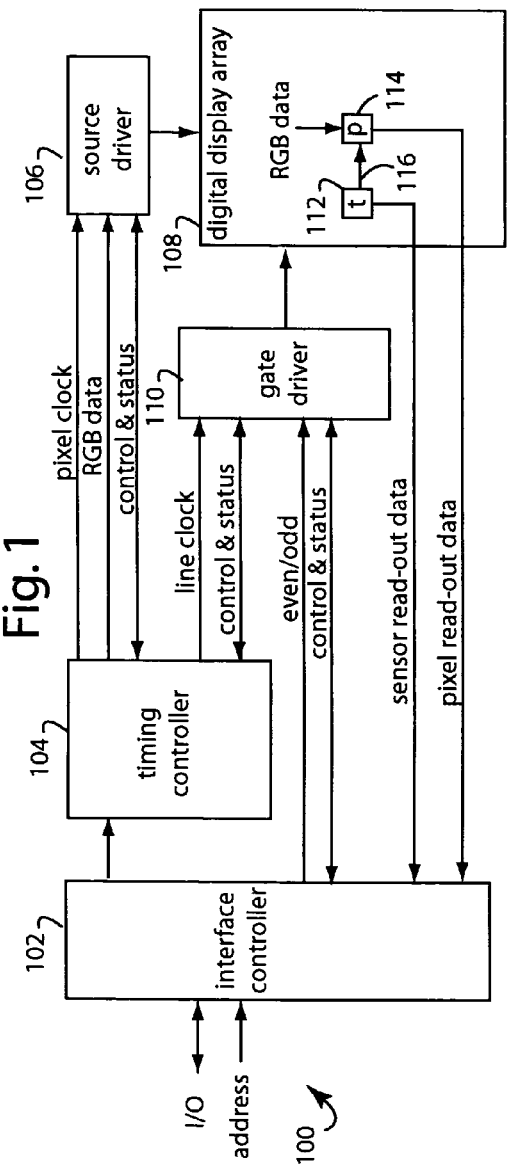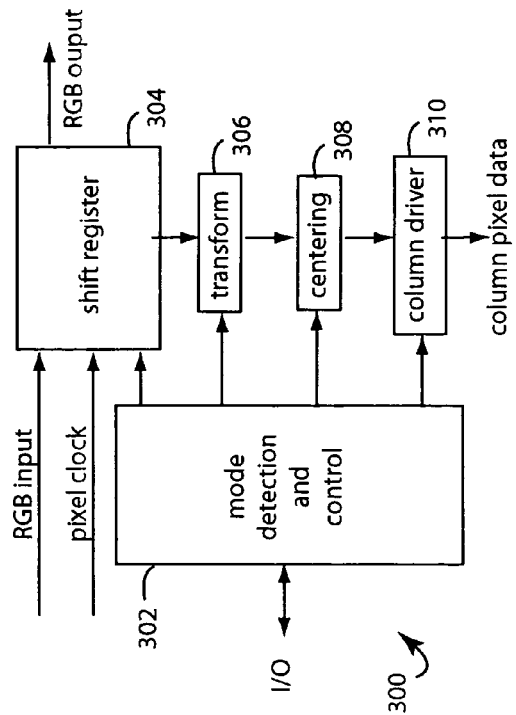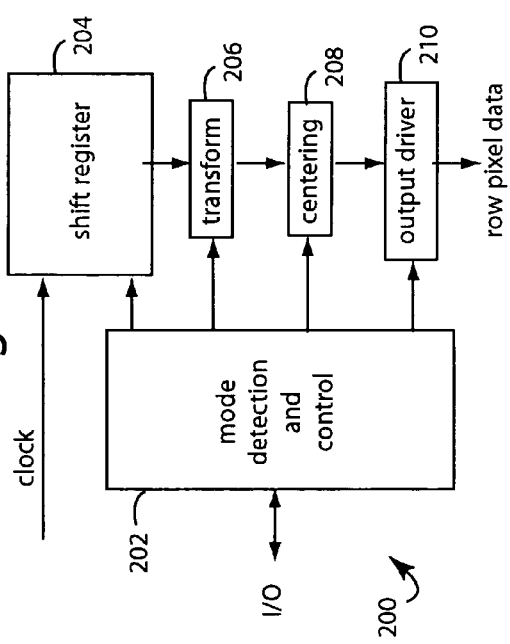

RANDOM ACCESS DISPLAY MONITOR

1. FIELD OF THE INVENTION

The present invention relates to computer and television displays, monitors, and screens, and in particular to direct, random access addressing of individual pixels in such.

2. DESCRIPTION OF THE PRIOR ART

Cathode ray tubes (CRT's) scan a beam of electrons inside across a front screen of phosphors. Such raster scanning was required by the nature of the CRT, and both progressive and interlaced raster scanning emerged as common ways to refresh the picture information on the screen. A typical broadcast TV picture is made up of 525 lines that are interlaced as two sub-frames delivered at about 60-Hz. Horizontal and vertical sync information is interspersed with the analog picture information to guarantee proper raster-scan timing.

The electron beam in a CRT is focused on a single pixel in the picture frame at any one instant, and the analog magnitude of the current determines how bright the pixel will be. Color CRT's use three electron beams that converge at a shadow mask with holes arranged at each tri-color pixel. The phosphor screen is made up of pixel triads of red, green, and blue phosphors that can only be accessed by their respective CRT electron gun through the apertures in the shadow mask. The relative strengths of each electron beam current determine the brightness, saturation, and hue.

The CRT is, by its nature, a serial-input, write-only device. The beam current information must be properly synchronized with the raster scanning controlling the beam's pixel-by-pixel location. If the picture information received has the wrong format, e.g., aspect ratio, magnification, progressive/interlaced scan, then it must be converted so the picture frame can be properly displayed.

The traditional CRT is now being replaced in many applications by projection, liquid crystal display (LCD), and plasma panels. Many of these new technologies do not need to be serially written, nor do they require raster scanning. System designers and manufacturers have nevertheless continued to interface signals to such new display technologies as if they were the old fashioned CRT.

The amount of picture information in one frame of a high resolution display can run into several hundred megabytes. If such picture information needs to be converted to accommodate a change or incompatibility in aspect ratio, interlace/progressive scanning method, magnification, etc., then all that information needs to be buffered and processed. The buffer memory and processing can be too expensive to manufacture and too slow in performance.

SUMMARY OF THE INVENTION

It is therefore an object of the present invention to provide a display monitor.

It is another object of the present invention to provide a display monitor that is inexpensive to produce.

It is a further object of the present invention to provide a display monitor that can direct pixel information immediately to the target pixels in real-time as they are received and without buffering or processing.

It is a still further object of the present invention to provide a display monitor that can be randomly accessed and both read and written.

Briefly, a display monitor system embodiment of the present invention includes a digital display panel that accepts pixel information in a variety of formats and standards, and adapts itself to send the real-time pixel information directly to the target pixels. An interface controller accepts and conditions NTSC or PAL TV-broadcast formats, and RGB, YUV, DVI, and VGA video formats into pixel information. A timing controller generates a pixel clock, RGB data, and controls for an LCD source driver. This feeds whole rows of pixel information into an LCD array. The timing control also provides line clock and controls to a horizontal-line gate driver associated with the LCD. The interface controller determines odd/even row, and progressive/interlaced timing, and feeds this control information to the horizontal-line gate driver. In an alternative embodiment, a transducer is associated with each pixel in the LCD array, and its information can be read out. The LCD array is therefore addressed as if it was a random access memory (RAM).

An advantage of the present invention is that a display monitor is provided.

Another advantage of the present invention is that a display monitor is provided that is inexpensive to produce.

A further advantage of the present invention is that a display monitor is provided that can provide a random-access read-back of pixel information, such as for touch-screen applications.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a display monitor system embodiment of the present invention;

FIG. 2 is a functional block diagram of a row driver embodiment of the present invention; and FIG. 3 is a functional block diagram of a source driver embodiment of the present invention.

DETAILED DESCRIPTION OF THE PREFERRED EMBODIMENT

FIG. 1 represents a display monitor system embodiment of the present invention, and is referred to herein by the general reference numeral 100. The display monitor system 100 accepts pixel information in a variety of industry formats and standards, and adapts itself to send the real-time pixel information directly to the target pixels for viewing. An interface controller 102 accepts and conditions "NTSC" or "PAL" TV-broadcast formats, and "RGB", "YUV", "DVI", and "VGA" video formats into pixel information. A timing controller 104 generates pixel clock, RGB data, and status/control signals for a source driver 106. This feeds whole rows of pixel information into digital display array panel 108. Liquid crystal displays (LCD's) and plasma panels are typical technologies useful for such digital display panel 108.

The timing controller 104 also provides line clock and controls to a horizontal-line gate driver 110 associated with the digital display panel 108. The interface controller 102 determines odd/even row, and progressive/interlaced timing, and feeds this control information to the horizontal-line gate driver 110.

In an alternative embodiment, a transducer 112 is associated with a pixel 114 in the digital display panel array 108. Such transducer 112 can be a pressure, temperature, light, strain, or other type sensor, depending on the application. A direct local connection 116 allows a measurement obtained from transducer 112 to directly affect a visual display quality of pixel 114. Of course, many such transducers 112 can be associated with many such corresponding pixels 114, individually or in groups.

One useful application of this is a touch-screen panel that has transducers that can sense when a user touches a particular point in the display. The direct connection 116 allows a signal to be sent that can invert or change the color being displayed on the array 108 at that point. Such direct connection 116 relieves a host CPU from having to attend to such a primitive chore. The bandwidth needed by the host-display interface is thereby reduced significantly.

Such touch-screen panels would therefore appear writable by the user, as it would leave tracks of what appears to be ink on the display surface. Such can also be used to present a form for a user to fill out with handwriting or to provide graphical user interface (GUI) check-off boxes or click-on hyperlinks.

Once a sensor has been affected or taken a measurement, a host CPU can interrogate the point and process the information. For example, such information may be used to ascertain which boxes were checked or to input a user's handwriting signature. A preferred way to read back this information to the host CPU would be to interface it as if it were a random access memory (RAM).

A local processor associated with each transducer and pixel combination, or local group, can be usefully employed to do vector calculations. For example, in a handwriting signature it very much matters what the speeds and directions are in each stroke of the signature. It may be possible for a forger to duplicate a final signature as it appears on paper, but it is near impossible to recreate the user's original hand motions used to create the genuine signature. Such local processing can be done with a highly specialized and very simplified processor embedded in the panel itself.

FIG. 2 represents a row driver 200 useful in the system 100 of FIG. 1, e.g., for gate driver 110. The row driver 200 comprises a mode detection and control 202, a shift register 204, a row transform unit 206, a centering unit 208, and an output driver 210. The row transform unit 206 does "1×" (100%), "1.5×" (66%), "2×" (50%), odd, and even line transformations needed for various input broadcast and video formats.

FIG. 3 represents a source driver 300 useful in the system 100 of FIG. 1. The source driver 300 comprises a mode detection and control 302, a shift register 304, a column transform unit 306, a centering unit 308, and an output driver 310. The shift register 304 receives 24-bit RGB data and pixel clock inputs. It outputs a 24-bit RGB signal to the digital display array. The column transform unit 306 does "1×" (100%), "1.5×" (66%), and "2×" (50%) transformations needed for various input broadcast and video formats.

The mode detection and control 302 counts the total number of horizontal lines in the frame and adjusts the timing. The resolution, degree of scaling, and centering are determined to optimally fill the available screen display area with minimal distortion. For example, aspect ratios of 4:3, 5:4, 5:3, 16:9, and 16:10, are choices that can be made. Dot resizing is done by row/column multiplex addressing, e.g., using the pixel clock to run the shift register 304.

In a method embodiment of the present information, incoming pixel is data input to a shift register at its normal rate but clocked through at a rate that scales the picture information to the digital display panel. For example, see shift register 304 in FIG. 3. The column and row information can be independently scaled this way without buffering and transformation involvement by a peripheral or host processor.

A method embodiment of the present invention for interactive video display includes displaying a dot of picture information in a pixel of a digital display panel. A sensor is associated and located proximate to such pixel such that a measurement obtained from said sensor is used to directly affect the visual appearance of the pixel to a user. It is advantageous to be able to address the visual array as if it were a random access memory (RAM), e.g., in order to write pixel information and to read corresponding transducer measurements from a row-column address. An automatic refresh is made possible by arranging the pixels themselves to by read out. In other words, a new complete frame of video information is not continuously required to maintain the picture display.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A display monitor system; comprising:
a digital display panel (108) with an array of pixels (114) for user viewing, and including an automatic refresh in which said pixels (114) provide pixel read-out data similar to a dynamic random access memory (DRAM) so a new complete frame of video information is not continuously required to maintain a picture display; and
a transducer for providing pressure, temperature, light, or strain sensor read-out data, and that is associated with a particular pixel (114), and having a direct connection (116) for directly affecting a visual quality of said particular pixel (114) without any involvement of a peripheral or a processor.

2. The display monitor system of claim 1, further comprising:
a gate driver (110) to address the visual array (108) like a random access memory (RAM), and to write pixel (114) information, and to read corresponding transducer (116) measurements from row-column addresses; and
a plurality of transducers (112) disposed in the digital display panel (108) wherein each is associated with a corresponding pixel (114), and such that a measurement each sensor obtains can be individually read out.

3. A method for making a video display to operate interactively, comprising:
configuring a digital display panel (108) to include an array of pixels (114) that can be addressed for writing or reading like a dynamic random access memory (DRAM) by row and column addresses;
associating a sensor (112) able to produce a pressure, temperature, light, or strain sensor read-out data, with a collocated pixel (114); and
coupling said sensor to said pixel such that a measurement signal obtained from said sensor (112) is directly connected (116) to said pixel (114) to enable an otherwise unassisted affect on a visual quality of said pixel.

4. The method of claim 3, further comprising:
independently scaling column and row information without buffering, and without transformation by a peripheral or host processor, by inputting incoming pixel data to a shift register (204, 304) at its 100% rate and clocking it through at another rate that scales picture information to said digital display panel (108).

5. A display monitor system; comprising:
a digital display panel (108) with an addressable array of pixels (114) for user viewing;

an automatic refresh in which said pixels (114) provide pixel read-out data similar to a dynamic random access memory (DRAM) so a new complete frame of video information is not continuously required to maintain a picture display; and a transducer (112) for providing pressure, temperature, light, or strain sensor read-out data.

6. A display monitor system; comprising:

a digital display panel (108) with an addressable array of pixels (114) for user viewing; and a transducer (112) for providing pressure, temperature, light, or strain sensor read-out data, and that is associated with a particular pixel (114); and a direct connection (116) from the transducer (112) for directly affecting a visual quality of said particular pixel (114) without any involvement of a peripheral device or a processor.

\* \* \* \* \*